Patented July 25, 1950

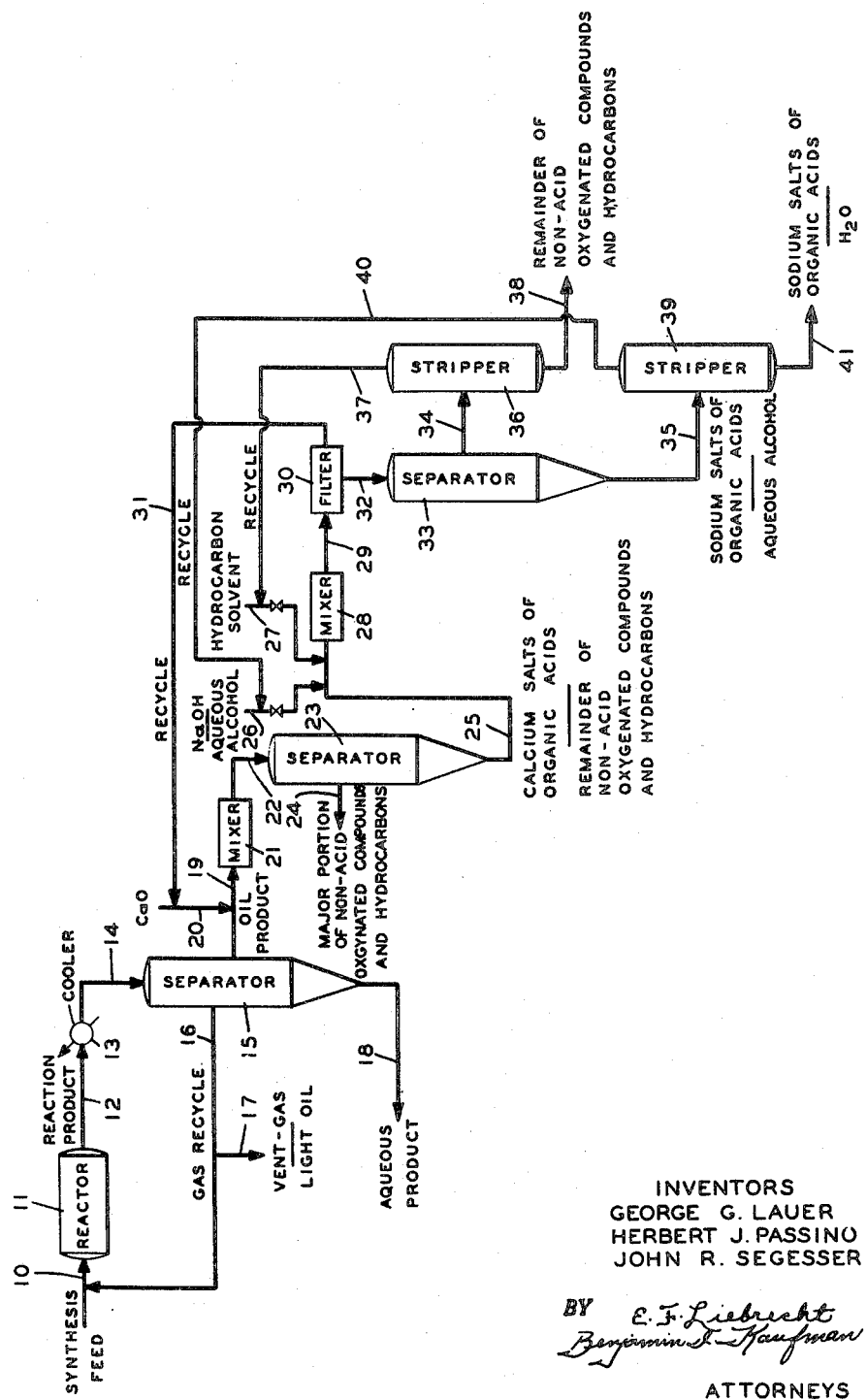

2,516,126

UNITED STATES PATENT OFFICE 2,516,126

SEPARATION OF ORGANIC COMPOUNDS

George G. Lauer, New York, N. Y., Herbert J. Passino, Englewood, N. J., and John R. Segesser, Oakland, Calif., assignors to The M. W. Kellogg Company, Jersey City, N. J., a corporation of Delaware Application March 2, 1948, Serial No. 12,524

17 Claims. (Cl. 260—450)

This invention relates to the separation of organic compounds and relates more particularly to a method for the separation of organic acids as their corresponding alkali salts from a hydrocarbon mixture containing them and other oxygenated organic compounds. Still more particularly, the invention relates to a method for the separation of organic acids as their corresponding alkali salts from a hydrocarbon-rich phase containing them and other oxygenated organic compounds, wherein this phase is obtained in processes for the catalytic hydrogenation of oxides of carbon.

It is well known that water-insoluble organic acids can be partially recovered from hydrocarbon mixtures containing them and other water-insoluble oxygenated organic compounds, by neutralizing the acids contained in these mixtures with an alkali, such as sodium hydroxide or potassium hydroxide, to obtain aqueous solutions of their corresponding salts. These salts may be next separated from the remaining oxygenated compounds and hydrocarbons by conventional means, such as distillation of non-acid material or water-washing of the salts which are then treated with an inorganic acid to obtain the corresponding free organic acids. It has been found, however, that the use of these alkalis in the above-mentioned processes, results in the formation of salts of organic acids which have strong solutizing properties for non-acid chemicals present in the mixture, and thus render the subsequent separation of these salts extremely difficult.

It is, therefore, an object of this invention to provide an improved method for separating water-insoluble organic acids as their corresponding alkali salts, from hydrocarbon mixtures containing them and other water-insoluble oxygenated organic compounds.

Another object of the invention is to provide an improved method for separating water-insoluble organic acids as their corresponding alkali salts, from a hydrocarbon-rich phase containing them and other water-insoluble non-acid oxygenated organic compounds, comprising alcohols, aldehydes, ketones, and esters, wherein each of the hydrocarbons and oxygenated compounds present in the phase has at least 4 carbon atoms per molecule and wherein this phase is obtained in processes for the catalytic hydrogenation of oxides of carbon.

Other objects and advantages inherent in the invention will be apparent from the following more detailed disclosure.

In accordance with the improved process of the invention, as more fully hereinafter disclosed, we have found that when the aforementioned mixtures of water-insoluble $C_4$ and higher hydrocarbons, organic acids, and other non-acid oxygenated compounds (which may comprise alcohols, aldehydes, ketones, and esters) are contacted with an oxide, hydroxide, or carbonate of the alkaline earth metals comprising calcium, barium or magnesium, substantially all of the acids present in the mixture are converted to their corresponding alkaline earth salts, and no precipitates of these salts are obtained, by reason of the non-acid components in the mixture having an unexpected solvent power for the formed alkaline earth salts of the organic acids, thus keeping these salts in solution. Upon subjecting the resulting mixture to phase separation, there is obtained an upper phase which comprises the major portion of non-acid oxygenated compounds and hydrocarbons present, and a lower phase which comprises the remaining portion of the mixture containing the aforementioned alkaline earth salts of the acids. This lower phase material is next treated with an alkali, such as sodium hydroxide or potassium hydroxide, in an amount sufficient to convert the alkaline earth salts to their corresponding alkali salts and to form the hydroxide of the alkaline earth metal. The formed hydroxide is then separated from other components present in the mixture, by filtering, centrifuging or other similar separation media. The lower phase material is also contacted with an aqueous solution of a water-soluble alcohol, in an amount sufficient to absorb substantially all of the alkali-salts of organic acids present, while non-acid oxygenated compounds and hydrocarbons present in this lower phase are extracted with a water-insoluble organic compound, such as a hydrocarbon having from 5 to 12 carbon atoms per molecule. The lower phase material is contacted with the aforementioned alkali, alcohol and hydrocarbon treating agents either as a mixture of the three treating agents, or as a mixture of any two treating agents followed by treatment with the third treating agent, or as successive treating steps employing each of the treating agents in any desired order.

Following the above-mentioned removal of the formed hydroxide of the alkaline earth metal, the treated lower phase material is subjected to phase separation to obtain an upper phase comprising the hydrocarbon treating agent and non-acid oxygenated compounds and hydrocarbons, and a lower phase comprising the aforementioned alkali salts and the aqueous solution of the alcohol treating agent. The hydrocarbon treating agent is subsequently stripped from non-acid oxygenated compounds and hydrocarbons in the last-mentioned upper phase and may be recycled for further use. Similarly, the alcohol treating agent is stripped from the alkali salts of the acids present in the last-mentioned lower phase and may also be recycled for further use. The separated alkali salts may then be recovered and worked up in any conventional manner known to those skilled in the art, for example, treating with a strong mineral acid, for converting these salts to their corresponding free organic acids, which may be separated from the remaining water by gravity settling.

In accordance with the general process of the invention, as broadly stated above, we have found this method particularly desirable, although not restricted thereto, in separating water-insoluble organic acids as their corresponding alkali salts from a hydrocarbon-rich phase containing them and other water-insoluble non-acid oxygenated organic compounds, wherein each of the components of the mixture has at least 4 carbon atoms per molecule, and wherein this hydrocarbon-rich phase is obtained by the condensation of the reaction product produced in the catalytic hydrogenation of oxides of carbon at elevated temperatures, as more fully hereinafter disclosed.

The accompanying drawing illustrates, diagrammatically, one form of the apparatus employed and capable of carrying out one embodiment of the process of the present invention. While the invention will be described in detail by reference to the embodiment of the process employing the apparatus illustrated in the drawing, it should be noted that it is not intended that the invention be limited thereto, but is capable of other embodiments which may extend beyond the scope of the apparatus illustrated. Some of the mechanical elements necessary to effect the transfer of liquids and vapors and to maintain the conditions of temperature and pressure necessary to carry out the function of the apparatus, are omitted in order to simplify the description. It will be understood, however, that much equipment of this nature is necessary and will be supplied by those skilled in the art. In addition, it should be noted that while in the embodiment illustrated and described, a hydrocarbon-rich phase obtained from the condensation of the reaction product produced in the catalytic hydrogenation of oxides of carbon at elevated temperatures, is presented as the feed-stock mixture from which the aforementioned organic acids are to be separated from other non-acid oxygenated organic compounds and hydrocarbons, this feedstock mixture may also comprise any mixture of water-insoluble organic acids, non-acid oxygenated organic compounds and hydrocarbons obtained from any source, wherein each compound has at least 4 carbon atoms per molecule and wherein the aforementioned components of the mixture are present in any ratios.

Referring to the drawing, a synthesis feed comprising a reaction mixture of hydrogen and an oxide of carbon, at varying mol ratios such as 2:1, is supplied through line 10 and transferred through this line to a synthesis reaction vessel represented in the drawing by reactor 11. In reactor 11 the reaction mixture is contacted with a hydrogenation catalyst such as a reduced iron or cobalt catalyst, at temperatures varying between about 300° F. and about 700° F. and at pressures varying between about atmospheric pressure and about 500 pounds per square inch, and is carried out according to conventional fixed-bed or fluid-bed operations. The resulting reaction product obtained from reactor 11 is withdrawn through line 12. This product is in the vapor form substantially as it comes from the reactor within the aforementioned temperature range, containing water, hydrocarbons, and oxygenated organic compounds comprising aldehydes, ketones, esters, acids, and alcohols and is first cooled to condense substantially large quantities of normally liquid components. Conveniently, condensation may be effected in a plurality of cooling stages which are represented diagrammatically in the drawing by cooler 13 with which line 12 connects. From cooler 13 the resulting mixture of condensate and uncondensed gases passes through line 14 to a separator 15. In the latter, uncondensed gases are withdrawn through line 16 and recycled through this line to the synthesis feed in line 10, with which line 16 connects. Vent-gas and uncondensed light oil may be withdrawn through line 17. The condensate in separator 15 separates as a lower aqueous phase and an upper oil phase. The aqueous phase is drawn off from the bottom of separator 15 through line 18 for further use or treatment outside the scope of the present process, and the oil phase is drawn off at an intermediate point through line 19. It should be noted that apparatus embodying more than one separation stage may be employed, if desired; for example, primary and secondary stages may be introduced, operating successively and respectively at temperatures of about 150° F. and about 100° F.

The oil product liquid phase withdrawn from separator 15 through line 19, comprises a hydrocarbon-rich mixture containing water-insoluble $C_4$ and higher hydrocarbons and organic acids and may also comprise other $C_4$ and higher water-insoluble oxygenated organic compounds, such as alcohols, aldehydes, ketones, and esters. This hydrocarbon-rich mixture in line 19 is next contacted with one or more compounds selected from the group consisting of the oxides, hydroxides, and carbonates of the alkaline earth metals comprising calcium, barium, and magnesium, in a solid or liquid form, calcium oxide being representative of the aforementioned compounds of the above named alkaline earth metals. The compound thus used, is introduced through line 20, with which line 19 connects, in an amount sufficient to convert substantially all of the acids present, into a solution of their alkaline earth salts, i. e., to the calcium salts of the acids in the embodiment illustrated.

In order to effect complete admixture of the calcium oxide and the acids contained in the aforementioned hydrocarbon-rich phase, the total mixture in line 19 is preferably transferred to a mixer 21. From mixer 21 the resulting mixture, comprising calcium salts of the organic acids, non-acid oxygenated organic compounds and hydrocarbons, is transferred through line 22 to a separator 23. In separator 23 the mixture is permitted to settle for a period of time sufficient to effect substantially complete separation into an upper phase which comprises the major portion of non-acid oxygenated compounds and hydrocarbons, and a lower phase comprising the aforementioned calcium salts of organic acids and the remaining portion of the non-acid oxygenated compounds and hydrocarbons present in the feed in line 19. The upper phase from separator 23 is withdrawn through line 24 for further use or treatment outside the scope of the present process, while the lower phase is withdrawn through line 25.

The lower phase material in line 25 is next contacted with an alkali in an amount sufficient to convert substantially all of the calcium salts of the acids to their corresponding alkali salts, although it has been found desirable to introduce the alkali in an excess of about 10%. For this purpose, such alkalis as sodium hydroxide or potassium hydroxide (the former being employed in the embodiment illustrated in the drawing), either in the solid form or in aqueous solutions, are introduced into line 25 through valved-line 26, to form the corresponding sodium salts of the acids and the hydroxide of the alkaline earth metal, namely, calcium hydroxide. The mixture in line 25 is also contacted with an aqueous solution of a water-soluble alcohol in an amount sufficient to absorb substantially all of the sodium salts of organic acids present. This aqueous solution of the alcohol treating agent may comprise an aqueous solution of methanol, ethanol, or propanol, in an alcohol to water ratio of approximately 1:1, while the preferred quantities of the alcohol solution employed may be two or three times, volumetrically, that of the total mixture comprising the aforementioned lower phase present in line 25. This aqueous solution of the alcohol treating agent, such as methanol, is also introduced into line 25 through line 26.

In order to facitate subsequent separation of the non-acid oxygenated compounds and hydrocarbons present in the aforementioned mixture in line 25, this mixture is also contacted with a substantially water-insoluble organic compound which is preferably a hydrocarbon, having from 5 to 12 carbon atoms per molecule, in an amount sufficient to absorb substantially all of the non-acid material present and is introduced into line 25 through valved-line 27. Such hydrocarbon treating agents may be used as pentane, hexane, or heptane, or saturated hydrocarbon fractions, or mixtures of saturated and unsaturated hydrocarbons having from 5 to 12 carbon atoms per molecule. In addition, it is possible to use lo boiling ethers such as ethyl or di-isopropyl ether, as treating agents if desired.

As previously indicated, the lower phase material in line 25 is contacted with the aforementioned alkali, alcohol, and hydrocarbon treating agents as a mixture of the aqueous solution of the alcohol treating agent and the alkali, which are introduced into line 26, and the hydrocarbon treating agent which is introduced through line 27. However, if so desired, it is possible to introduce all three treating agents into line 25, simultaneously or successively, through one line such as line 26; or a mixture of any two of the treating agents may be introduced through one line followed by the introduction of the third treating agent through another line.

To effect complete admixture of the treated material contained in line 25, the total mixture is transferred through this line to a mixer 28. From mixer 28 the resulting mixture, comprising sodium salts of organic acids, absorbed in the alcohol treating agent, absorbed hydrocarbons and non-acid oxygenated compounds in the hydrocarbon treating agent and calcium hydroxide, is transferred through line 29 to a filter, filter-press, centrifuge or other similar separation media, represented in the drawing by filter 30, to separate the formed calcium hydroxide from the other components present in the mixture. Calcium hydroxide thus separated is transferred from filter 30 through line 31 and thus recycled to the calcium oxide feed in line 20, with which line 31 connects.

Following the aforementioned removal of the formed hydroxide of the alkaline earth metal, i. e., calcium hydroxide, the remainder of the mixture in filter 30 is withdrawn through line 32. This mixture is next transferred through this line to a separator 33. In separator 33 the mixture is permitted to settle for a period of time sufficient to effect substantially complete separation of the components into an upper phase, which comprises a mixture of oxygenated organic compounds and absorbed hydrocarbons in the hydrocarbon treating agent, which is withdrawn through line 34, and a lower phase which comprises a mixture of the sodium salts of organic acids and the aqueous solution of the alcohol treating agent, which is withdrawn through line 35.

The upper phase from separator 33, comprising a mixture of oxygenated organic compounds and hydrocarbons absorbed in the hydrocarbon treating agent is transferred through line 34 to a stripper 36. Stripper 36 is operated under conditions of temperature and pressure effective to distill overhead the hydrocarbon treating agent, which is withdrawn through line 37 and recycled through this line to combine with the hydrocarbon treating agent feed in line 27, with which line 37 connects. Bottoms from stripper 36, comprising non-acid oxygenated organic compounds and hydrocarbons, are withdrawn through line 38 for further use or treatment outside the scope of the present process.

The lower phase in separator 33, comprising a mixture of the aforementioned sodium salts of organic acids and the aqueous solution of the alcohol treating agent (methanol, in the embodiment illustrated) is transferred through line 35 to a stripper 39. Stripper 39 is operated under conditions of temperature and pressure effective to distill overhead the alcohol treating agent, which is withdrawn through line 40 and recycled through this line to combine with the alcohol treating agent feed in line 26, with which line 40 connects. Bottoms from stripper 39, comprising an aqueous solution of the sodium salts of organic acids, are withdrawn through line 41. These separated alkali salts may be next worked up in any conventional manner known to those skilled in the art, for example, treating them with a strong mineral acid such as sulfuric acid or hydrochloric acid to convert these alkali salts to their corresponding free organic acids.

The following specific examples will serve to illustrate but are not intended in any way to limit unduly the broad scope of the invention.

*Example I*

3000 grams of a hydrocarbon-rich mixture, obtained from the condensation of the reaction product produced in the catalytic hydrogenation of carbon monoxide, containing $C_4$ and higher hydrocarbons and $C_4$ and higher water-insoluble organic acids, alcohols, aldehydes, ketones, and esters, was neutralized under cooling with a concentrated slurry of calcium oxide in water (containing 85 grams of dry calcium oxide) until a pH of 8.5 was reached. This treated mixture was passed through a centrifuge and an upper layer of 2390 grams containing only traces of acidic components in the form of calcium salts was obtained. The lower viscous layer of 610 grams was next contacted in a mixer with 1800 grams of an aqueous solution of methanol (1:1) which contained sodium hydroxide in a 10% excess of the calcium oxide previously employed in the neutralization step. Simultaneously, 1400 grams of pentane were added. The entire mixture was next passed through a filter to remove calcium hydroxide and then subjected to gravity settling. The resulting upper layer was found to be substantially free from any salts of organic acids, and was next stripped of pentane. 270 grams of pentane-free oil thus obtained were combined with the upper layer from the centrifuging step, thus representing 2660 grams of acid-free material. The remaining lower layer from the gravity settling step, was stripped of methanol and acidified with sulfuric acid, whereupon 325 grams of free organic acids were obtained as a result of the treatment.

*Example II*

3000 grams of the mixture employed in Example I were similarly neutralized with calcium oxide, allowing the temperature to rise to 45° C. The treated mixture was allowed to stratify for 4 hours, thereby separating into two layers. The lower viscous layer of 505 grams was next contacted in a mixer with 1200 grams of an aqueous solution of ethyl alcohol (1:1) which contained potassium hydroxide in a 10% excess of the calcium oxide previously used. Then 1000 grams of hexane was added and the entire mixture passed into a centrifuge to yield three phases: solid calcium hydroxide, aqueous alcohol containing potassium salts of organic acids, and hexane containing the non-acidic organic material. After working up the liquid phases similarly to Example I, 180 grams of non-acidic oil and 325 grams of acids were obtained.

*Example III*

The process of Example II was repeated, except that ethyl ether was substituted for hexane as the treating agent, which was added to the feed simultaneously with the aqueous alcohol and alkali. Carrying through the steps as described in Example II, there were obtained approximately 320 grams of free organic acids as a result of the processing operation.

It should be noted that while a particular embodiment of the process of this invention has been described for purposes of illustration, various modifications and adaptations thereof which will be obvious to one skilled in the art, may be made within the spirit of the invention as set forth in the appended claims.

Having thus described our invention, what we claim and desire to secure by Letters Patent is:

1. In a process for the catalytic hydrogenation of an oxide of carbon in which is obtained a hydrocarbon-rich phase containing oxygenated organic compounds comprising organic acids and non-acid oxygenated organic compounds and wherein each of said hydrocarbons and oxygenated compounds has at least four carbon atoms per molecule, the method of separating said acids as their corresponding alkali salts from said phase which comprises the steps of contacting said phase with at least one compound selected from the group consisting of the oxides, hydroxides and carbonates of the alkaline earth metals, calcium, barium and magnesium in an amount sufficient to convert substantially all of said acids to a solution of their corresponding alkaline earth salts, subjecting the resulting mixture to phase separation to obtain an upper phase comprising the major portion of said non-acid oxygenated compounds and hydrocarbons and a lower phase comprising said alkaline earth salts and the remaining portion of said non-acid oxygenated compounds and hydrocarbons, separating said phases, contacting said lower phase with an alkali in an amount sufficient to convert substantially all of said alkaline earth salts to their corresponding alkali salts and to form the hydroxide of said alkaline earth metal, contacting said lower phase with an aqueous solution of a water-soluble alcohol treating agent in an amount sufficient to absorb substantially all of said alkali salts, contacting said lower phase with a water-insoluble organic compound in an amount sufficient to absorb substantially all of said non-acid oxygenated compounds and hydrocarbons, separating said formed hydroxide of said alkaline earth metal from the resulting mixture, subjecting the remainder of said last-mentioned mixture to phase separation to obtain an upper phase comprising said water-insoluble organic compound and said remaining portion of non-acid oxygenated compounds and hydrocarbons and a lower phase comprising said alkali salts and said alcohol treating agent, separating said phases, and separating said alkali salts from said alcohol treating agent in said last-mentioned lower phase.

2. In a process for the catalytic hydrogenation of an oxide of carbon in which is obtained a hydrocarbon-rich phase containing oxygenated organic compounds comprising organic acids and non-acid oxygenated organic compounds and wherein each of said hydrocarbons and oxygenated compounds has at least 4 carbon atoms per molecule, the method of separating said acids as their corresponding alkali salts from said phase which comprises the steps of contacting said phase with at least one compound selected from the group consisting of the oxides, hydroxides and carbonates of the alkaline earth metals, calcium, barium and magnesium in an amount sufficient to convert substantially all of said acids to a solution of their corresponding alkaline earth salts, subjecting the resulting mixture to phase separation to obtain an upper phase comprising the major portion of said non-acid oxygenated compounds and hydrocarbons and a lower phase comprising said alkaline earth salts and the remaining portion of said non-acid oxygenated compounds and hydrocarbons, separating said phases, contacting said lower phase with an alkali in an amount sufficient to convert substantially all of said alkaline earth salts to their corresponding alkali salts and to form the hydroxide of said alkaline earth metal, contacting said lower phase with an aqueous solution of a water-soluble alcohol treating agent in an amount sufficient to absorb substantially all of said alkali salts, contacting said lower phase with a hydrocarbon treating agent having from 5 to 12 carbon atoms per molecule in an amount sufficient to absorb substantially all of said non-acid oxygenated compounds and hydrocarbons, separating said formed hydroxide of said alkaline earth metal from the resulting mixture, subjecting the remainder of said last-mentioned mixture to phase separation to obtain an upper phase comprising said hydrocarbon treating agent and said remaining portion of non-acid oxygenated compounds and hydrocarbons and a lower phase comprising said alkali salts and said alcohol treating agent, separating said phases, and separating said alkali salts from said alcohol treating agent in said last-mentioned lower phase.

3. The method of claim 2 wherein the compound of said alkaline earth metals is calcium oxide.

4. The method of claim 2 wherein the compound of said alkaline earth metals is calcium hydroxide.

5. The method of claim 2 wherein the compound of said alkaline earth metals is barium oxide.

6. The method of claim 2 wherein the compound of said alkaline earth metals is magnesium oxide.

7. The method of claim 2 wherein the compound of said alkaline earth metals is magnesium hydroxide.

8. The method of claim 2 wherein the alkali is sodium hydroxide.

9. The method of claim 2 wherein the alkali is potassium hydroxide.

10. The method of claim 2 wherein the water-soluble alcohol treating agent is methanol.

11. The method of claim 2 wherein the water-soluble alcohol treating agent is ethanol.

12. The method of claim 2 wherein the water-soluble alcohol treating agent is propanol.

13. The method of claim 2 wherein said water-insoluble hydrocarbon treating agent is pentane.

14. The method of claim 2 wherein said water-insoluble hydrocarbon treating agent is hexane.

15. The method of claim 2 wherein said water-insoluble hydrocarbon treating agent is heptane.

16. In a process for the catalytic hydrogenation of an oxide of carbon in which is obtained a hydrocarbon-rich phase containing oxygenated organic compounds comprising organic acids and non-acid oxygenated organic compounds and wherein each of said hydrocarbons and oxygenated compounds has at least 4 carbon atoms per molecule, the method of separating said acids as their corresponding sodium salts from said phase which comprises the steps of contacting said phase with calcium oxide in an amount sufficient to convert substantially all of said acids to a solution of their corresponding calcium salts, subjecting the resulting mixture to phase separation to obtain an upper phase comprising the major portion of said non-acid oxygenated compounds and hydrocarbons and a lower phase comprising said calcium salts and the remaining portion of said non-acid oxygenated compounds and hydrocarbons, separating said phases, contacting said lower phase with sodium hydroxide in an amount sufficient to convert substantially all of said calcium salts to their corresponding sodium salts and to form calcium hydroxide, contacting said lower phase with an aqueous solution of methanol in an amount sufficient to absorb substantially all of said sodium salts, contacting said lower phase with pentane in an amount sufficient to absorb substantially all of said non-acid oxygenated compounds and hydrocarbons, separating said formed calcium hydroxide from the resulting mixture, subjecting the remainder of said last-mentioned mixture to phase separation to obtain an upper phase comprising pentane and said remaining portion of non-acid oxygenated compounds and hydrocarbons and a lower phase comprising said sodium salts and methanol, separating said phases, and separating said sodium salts from methanol in said last-mentioned lower phase.

17. In a process for the catalytic hydrogenation of an oxide of carbon in which is obtained a hydrocarbon-rich phase containing oxygenated organic compounds comprising organic acids and non-acid oxygenated organic compounds and wherein each of said hydrocarbons and oxygenated compounds has at least four carbon atoms per molecule, the method of separating said acids as their corresponding sodium salts from said phase which comprises the steps of contacting said phase with calcium oxide in an amount sufficient to convert substantially all of said acids to a solution of their corresponding calcium salts, subjecting the resulting mixture to phase separation to obtain an upper phase comprising the major portion of said non-acid oxygenated compounds and hydrocarbons and a lower phase comprising said calcium salts and the remaining portion of said non-acid oxygenated compounds and hydrocarbons, separating said phases, contacting said lower phase with sodium hydroxide in an amount sufficient to convert substantially all of said calcium salts to their corresponding sodium salts and to form calcium hydroxide, contacting said lower phase with an aqueous solution of methanol in an amount sufficient to absorb substantially all of said sodium salts, contacting said lower phase with pentane in an amount sufficient to absorb substantially all of said non-acid oxygenated compounds and hydrocarbons, separating said formed calcium hydroxide from the resulting mixture, subjecting the remainder of said last-mentioned mixture to phase separation to obtain an upper phase comprising pentane and said remaining portion of non-acid oxygenated compounds and hydrocarbons and a lower phase comprising said sodium salts and methanol, separating said phases, separating pentane from said remaining portion of non-acid oxygenated compounds and hydrocarbons in said last-mentioned upper phase, recycling pentane thus separated to said pentane treating step, separating methanol from said sodium salts in said last-mentioned lower phase, and recycling methanol thus separated to said methanol treating step.

GEORGE G. LAUER.
HERBERT J. PASSINO.
JOHN R. SEGESSER.

REFERENCES CITED

The following references are of record in the file of this patent:

UNITED STATES PATENTS

| Number | Name | Date |
| --- | --- | --- |
| 1,681,185 | James | Aug. 26, 1928 |
| 1,943,427 | Franzen et al. | Jan. 16, 1934 |
| 2,073,054 | Franzen et al. | Mar. 9, 1937 |
| 2,438,449 | Mosesman | Mar. 23, 1948 |